(12) United States Patent
Reybrouck

(10) Patent No.: US 9,108,484 B2
(45) Date of Patent: Aug. 18, 2015

(54) RECUPERATING PASSIVE AND ACTIVE SUSPENSION

(71) Applicant: Tenneco Automotive Operating Company Inc., Lake Forest, IL (US)

(72) Inventor: Koen Reybrouck, Brussels (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 13/950,379

(22) Filed: Jul. 25, 2013

(65) Prior Publication Data

US 2015/0028551 A1    Jan. 29, 2015

(51) Int. Cl.
*B60G 15/06*    (2006.01)

(52) U.S. Cl.
CPC ........ *B60G 15/063* (2013.01); *B60G 2204/127* (2013.01); *B60G 2204/1242* (2013.01); *B60G 2204/12422* (2013.01)

(58) Field of Classification Search
CPC .................................................... B60G 15/063
USPC .......................... 280/124.154, 124.145, 5.508
See application file for complete search history.

(56) References Cited

U.S. PATENT DOCUMENTS

| | | | | |
|---|---|---|---|---|
| 3,954,255 | A * | 5/1976 | Keijzer et al. | 267/34 |
| 4,162,091 | A * | 7/1979 | Sano | 280/124.154 |
| 5,137,299 | A | 8/1992 | Jones | |
| 5,162,995 | A | 11/1992 | Ikemoto et al. | |
| 5,231,583 | A | 7/1993 | Lizell | |
| 5,243,525 | A * | 9/1993 | Tsutsumi et al. | 701/37 |
| 5,342,023 | A | 8/1994 | Kuriki et al. | |
| 5,678,847 | A * | 10/1997 | Izawa et al. | 280/5.515 |
| 5,961,106 | A * | 10/1999 | Shaffer | 267/221 |
| 6,092,815 | A * | 7/2000 | Rutz et al. | 280/5.505 |
| 6,155,545 | A * | 12/2000 | Noro et al. | 267/221 |
| 6,182,806 | B1 * | 2/2001 | Hasegawa | 188/314 |
| 6,367,830 | B1 * | 4/2002 | Annequin et al. | 280/93.512 |
| 6,830,256 | B2 * | 12/2004 | Bryant | 280/124.106 |
| 7,325,634 | B2 | 2/2008 | Law et al. | |
| 7,726,674 | B2 * | 6/2010 | VanDenberg et al. | 280/124.128 |
| 7,926,822 | B2 * | 4/2011 | Ohletz et al. | 280/5.514 |
| 8,016,306 | B2 * | 9/2011 | Isono | 280/124.135 |
| 8,029,002 | B2 * | 10/2011 | Maurer et al. | 280/5.515 |
| 8,070,171 | B2 * | 12/2011 | Wohlfarth | 280/6.157 |
| 8,408,569 | B2 * | 4/2013 | Keil et al. | 280/124.154 |
| 8,434,772 | B2 * | 5/2013 | Keil et al. | 280/124.154 |
| 8,556,047 | B2 * | 10/2013 | Kondou et al. | 188/283 |
| 8,827,292 | B2 * | 9/2014 | Batsch et al. | 280/124.161 |
| 8,833,775 | B2 * | 9/2014 | Kim et al. | 280/5.514 |

(Continued)

FOREIGN PATENT DOCUMENTS

| | | | | |
|---|---|---|---|---|
| DE | 102005001740 | B3 * | 7/2006 | ............. B60G 17/02 |
| EP | 1953013 | A2 * | 8/2008 | ............. B60G 15/06 |

(Continued)

OTHER PUBLICATIONS

Search Report and Written Opinion dated Sep. 24, 2014 in corresponding PCT Application No. PCT/US2014/038884 (12 pages).

*Primary Examiner* — Nicole Verley

(74) *Attorney, Agent, or Firm* — Harness, Dickey & Pierce, P.L.C.

(57) ABSTRACT

An automobile includes an active suspension system and a leveling system. The leveling system receives high pressure fluid from the active suspension system in order to change static vehicle height and compensate for static load changes.

14 Claims, 4 Drawing Sheets

(56) References Cited

U.S. PATENT DOCUMENTS

| | | | |
|---|---|---|---|
| 2006/0175776 A1* | 8/2006 | Christophel et al. | 280/6.157 |
| 2009/0302559 A1* | 12/2009 | Doerfel | 280/5.519 |
| 2010/0207343 A1* | 8/2010 | Sano | 280/124.106 |
| 2011/0187065 A1 | 8/2011 | Van Der Knaap et al. | |
| 2011/0221109 A1* | 9/2011 | Hinouchi | 267/221 |
| 2011/0266765 A1* | 11/2011 | Nowak | 280/124.154 |
| 2012/0181127 A1* | 7/2012 | Keil et al. | 188/297 |

FOREIGN PATENT DOCUMENTS

| | | | | |
|---|---|---|---|---|
| EP | 2119580 A1 * | 11/2009 | | F16F 1/12 |
| EP | 2145781 A1 * | 1/2010 | | B60G 17/019 |
| JP | 2005-121038 | 5/2005 | | |
| JP | 2005-145295 | 6/2005 | | |
| JP | 2005-280514 | 10/2005 | | |
| JP | 2010-000857 | 1/2010 | | |
| WO | WO 2009124617 A1 * | 10/2009 | | B60G 15/06 |

* cited by examiner

RECUPERATING PASSIVE AND ACTIVE SUSPENSION

FIELD

The present disclosure is directed to an active suspension system. More particularly, the present disclosure is directed to an active suspension system that incorporates a leveling system in conjunction with the active suspension system.

BACKGROUND

This section provides background information related to the present disclosure which is not necessarily prior art.

Suspension systems are provided to filter or isolate the vehicle's body (sprung portion) from the vehicle's wheels and axles (unsprung portion) when the vehicle travels over vertical road surface irregularities as well as to control body and wheel motion. In addition, suspension systems are also used to maintain an average vehicle attitude to promote improved stability of the vehicle during maneuvering. The typical passive suspension system includes a spring and a damping device in parallel with the spring which are located between the sprung portion and the unsprung portion of the vehicle.

Hydraulic actuators, such as shock absorbers and/or struts, are used in conjunction with conventional passive suspension systems to absorb unwanted vibration which occurs during driving. To absorb this unwanted vibration, hydraulic actuators include a piston located within a pressure cylinder of the hydraulic actuator. The piston is connected to one of the unsprung portion or suspension and the sprung portion or body of the vehicle through a piston rod. The pressure tube is connected to the other of the unsprung portion and sprung portion of the vehicle. Because the piston is able to restrict the flow of damping fluid within the working chamber of the hydraulic actuator when the piston is displaced within the pressure cylinder, the hydraulic actuator is able to produce a damping force which counteracts the vibration of the suspension. The greater the degree to which the damping fluid within the working chamber is restricted by the piston, the greater the damping forces which are generated by the hydraulic actuator.

In recent years, substantial interest has grown in automotive vehicle suspension systems which can offer improved comfort and road handling over the conventional passive suspension systems. In general, such improvements are achieved by utilization of an "intelligent" suspension system capable of electronically controlling the suspension forces generated by hydraulic actuators.

Different levels in achieving the ideal "intelligent" suspension system called a semi-active or a fully active suspension system are possible. Some systems control and generate damping forces based upon the dynamic forces acting against the movement of the piston. Other systems control and generate damping forces based on the static or slowly changing dynamic forces, acting on the piston independent of the velocity of the piston in the pressure tube. Other, more elaborate systems, can generate variable damping forces during rebound and compression movements of the hydraulic actuator regardless of the position and movement of the piston in the pressure tube.

SUMMARY

This section provides a general summary of the disclosure, and is not a comprehensive disclosure of its full scope or all of its features.

The present disclosure provides the art with a leveling system which is in communication with an active suspension system. The fluid pressure used to control the active suspension system is provided to the leveling system to change the height of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
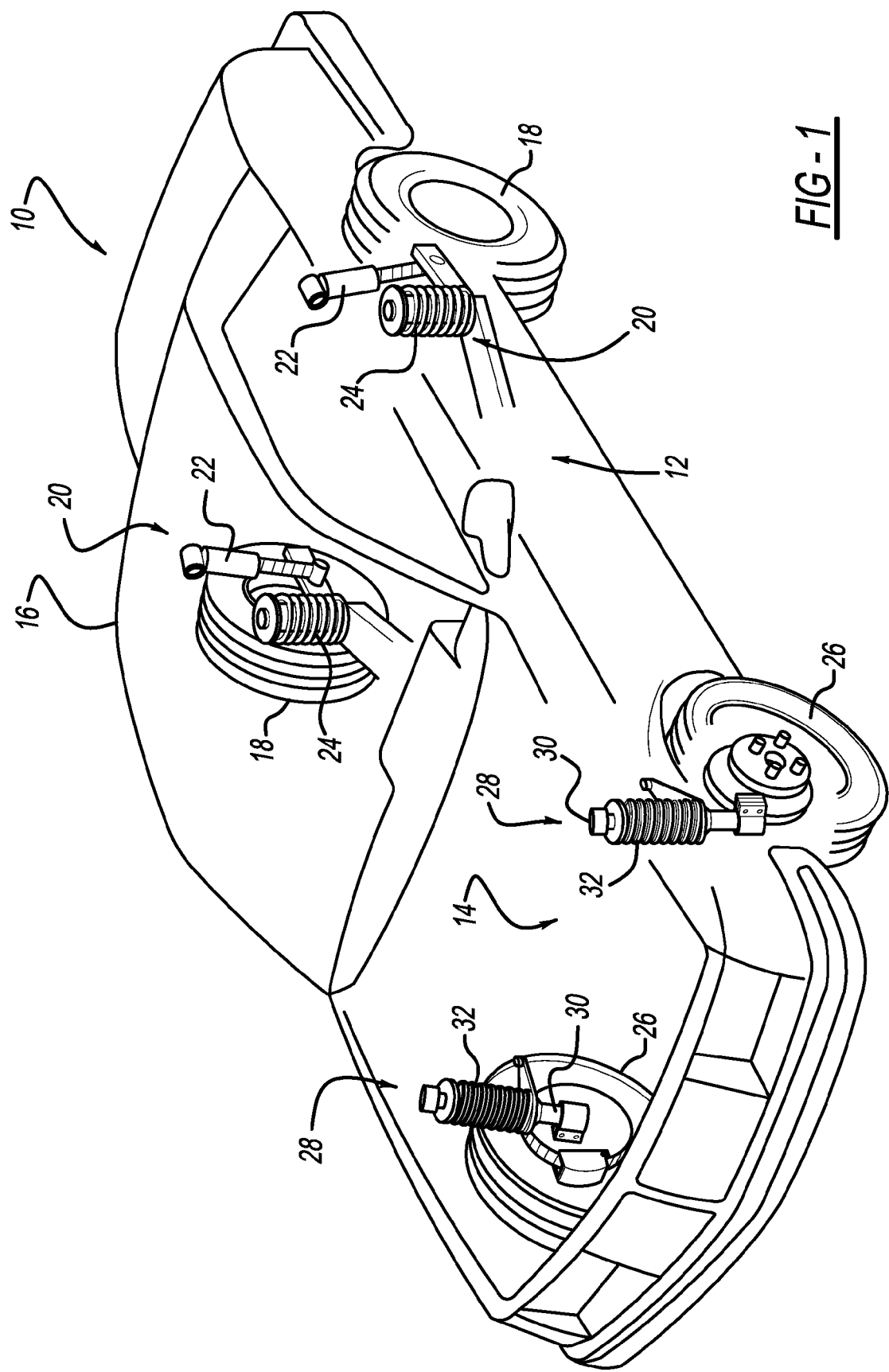
FIG. 1 is a diagrammatic illustration of a vehicle incorporating the leveling system and the active suspension system in accordance with the present disclosure.

The following description is merely exemplary in nature and is not intended to limit the present disclosure, application or uses. There is shown in FIG. 1 a vehicle incorporating a suspension system having a suspension system in accordance with the present disclosure and which is designated generally by the reference numeral 10. Vehicle 10 comprises a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of corner assemblies 20 which include a pair of shock absorbers 22 and a pair of helical coil springs 24. Similarly front suspension 14 includes a transversely extending front axle assembly (not shown) to operatively support the vehicle's front wheels 26. The front axle assembly is operatively connected to body 16 by means of a second pair of corner assemblies 28 which include a pair of shock absorbers 30 and by a pair of shaped helical coil springs 32. Shock absorbers 22 and 30 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 22 and 30 may be used with other types of vehicles and/or in other types of applications such as vehicles incorporating independent front and/or independent rear suspension systems. Further, the term "shock absorber" as used herein is meant to be dampers in general and thus will include struts. Also, while front suspension 14 is illustrated having a pair of struts or shock absorbers 30, it is within the scope of the present invention to have rear suspension 12 incorporate a pair of struts or shock absorbers 30 if desired. As illustrated in FIG. 1, shock absorber 22 is separate from spring 24. In this configuration, the adjustable spring seat is disposed between the sprung and unsprung portions of the vehicle. Also, shock absorber 22 and spring 24 can be replaced with corner assemblies 28.

Figure 2:
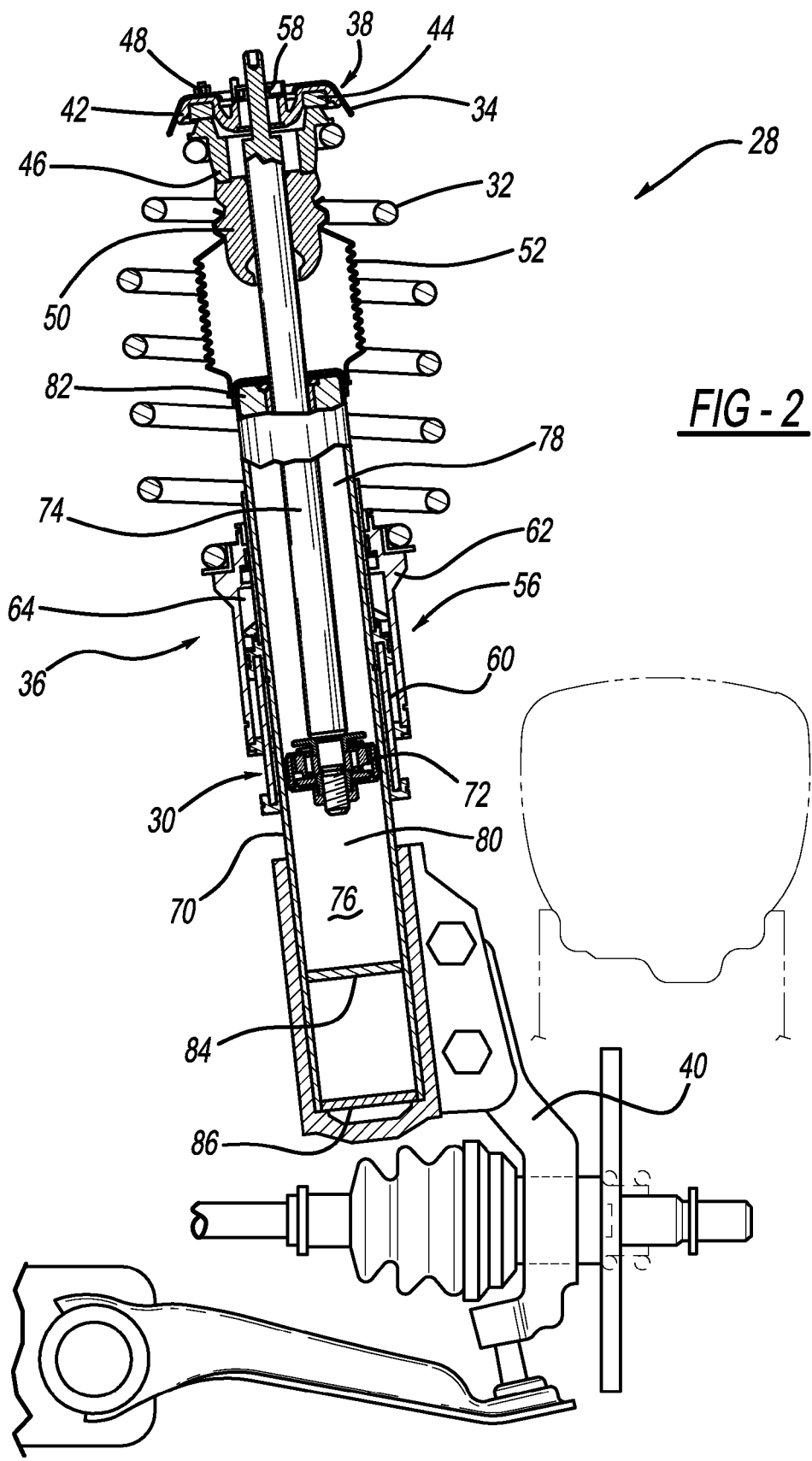
FIG. 2 is a schematic view of one of the corner assemblies including the hydraulic actuator illustrated in FIG. 1 illustrating the components of the hydraulic actuator.

Referring now to FIG. 2, the front corner assembly 28 for vehicle 10 is illustrated in greater detail. Body 16 defines a shock tower 34 comprising sheet metal of vehicle 10 within which is mounted a strut assembly 36 which comprises a telescoping device in the form of shock absorber 30, coil spring 32, a top mount assembly 38 and a knuckle 40 which is part of a wheel assembly. Strut assembly 36 including shock absorber 30, coil spring 32 and top mount assembly 38 are attached to vehicle 10 using shock tower 34. Top mount assembly 38, a part of the sprung portion of the vehicle, comprises a top mount 42, a bearing assembly 44 and an upper spring seat 46. Top mount 42 comprises an integral molded body and a rigid body member, typically made of stamped steel. Top mount assembly 38 is mounted to shock tower 34 by bolts 48. Bearing assembly 44 is friction fit within the molded body of top mount 42 to be seated in top mount 42 so that one side of bearing assembly 44 is fixed relative to top mount 42 and shock tower 34. The second side of bearing assembly 44 freely rotates with respect to the first side of bearing assembly 44, top mount 42 and shock tower 34.

The free rotating side of bearing assembly 44 carries upper spring seat 46 that is clearance fit to the outer diameter of bearing assembly 44. An elastomeric jounce bumper 50 is disposed between upper spring seat 46 and shock absorber 30. Elastomeric jounce bumper 50 comprises an elastomeric material which is protected by a plastic dirt shield 52.

A hydraulic adjustable lower spring seat assembly 56, which is part of the unsprung portion of the vehicle, is attached to shock absorber 30 and coil spring 32. Coil spring 32 is disposed between upper spring seat 46 and lower spring seat assembly 56 to isolate body 16 from front suspension 14. While shock absorber 30 is illustrated in FIG. 2, it is to be understood that shock absorber 22 may also include the features described herein for shock absorber 30.

Prior to the assembly of strut assembly 36 into vehicle 10, the pre-assembly of strut assembly 36 is performed. Elastomeric jounce bumper 50 and plastic dirt shield 52 are assembled to shock absorber 30. Coil spring 32 is assembled over shock absorber 30 and positioned within lower spring seat assembly 56. Upper spring seat 46 is assembled onto shock absorber 30 and correctly positioned with respect to coil spring 32. Bearing assembly 44 is positioned on top of upper spring seat 46 and top mount 42 is positioned on top of bearing assembly 44. This entire assembly is positioned within an assembly machine which compresses coil spring 32 such that the end of shock absorber 30 extends through a bore located within top mount assembly 38. A retaining nut 58 is threadingly received on the end of shock absorber 30 to secure the assembly of strut assembly 36.

Top mount 42 is designed as an identical component for the right and left hand sides of the vehicle but it has a different orientation with respect to shock absorber 30 and its associated bracketry when it is placed on the right or left side of the vehicle.

Hydraulic adjustable spring seat assembly 56 includes an inner housing assembly 60 attached to shock absorber 30 and an outer housing assembly 62 that is attached to both shock absorber 30 and coil spring 32. Inner housing assembly 60 and outer housing assembly 62 define a fluid chamber 64. When fluid is added to fluid chamber 64, outer housing assembly 62 will move upward along shock absorber 30, as illustrated in FIG. 2. This movement will raise vehicle body 16 with respect to front suspension 14. When fluid is removed from fluid chamber 64, outer housing assembly 62 will move downward along shock absorber 30, as illustrated in FIG. 2. This movement will lower vehicle body 16 with respect to front suspension 14. Fluid chamber 64 is in fluid communication with shock absorber 30 as described below.

Shock absorber 30 is a mono-tube designed shock absorber comprising a pressure tube 70, a piston assembly 72 and a piston rod 74.

Pressure tube 70 defines a fluid chamber 76. Piston assembly 72 is slidably disposed within pressure tube 70 and divides fluid chamber 76 into an upper working chamber 78 and a lower working chamber 80. A seal is disposed between piston assembly 72 and pressure tube 70 to permit sliding movement of piston assembly 72 with respect to pressure tube 70 without generating undue frictional forces as well as sealing upper working chamber 78 from lower working chamber 80. Piston rod 74 is attached to piston assembly 72 and extends through upper working chamber 78 and through an upper end cap 82 which closes the upper end of pressure tube 70. A sealing system seals the interface between upper end cap 82, pressure tube 70 and piston rod 74. The end of piston rod 74 opposite to piston assembly 72 is adapted to be secured to the one of sprung and unsprung mass of vehicle 10. Valving within piston assembly 72 controls the movement of fluid between upper working chamber 78 and lower working chamber 80 during movement of piston assembly 72 within pressure tube 70. Because piston rod 74 extends only through upper working chamber 78 and not lower working chamber 80, movement of piston assembly 72 with respect to pressure tube 70 causes a difference in the amount of fluid displaced in upper working chamber 78 and the amount of fluid displaced in lower working chamber 80. The difference in the amount of fluid displaced is known as the "rod volume" and it is accommodated for by the use of a floating piston 84 as is well known in the art. An end cap 86 seals the end of pressure tube 70.

Figure 3:
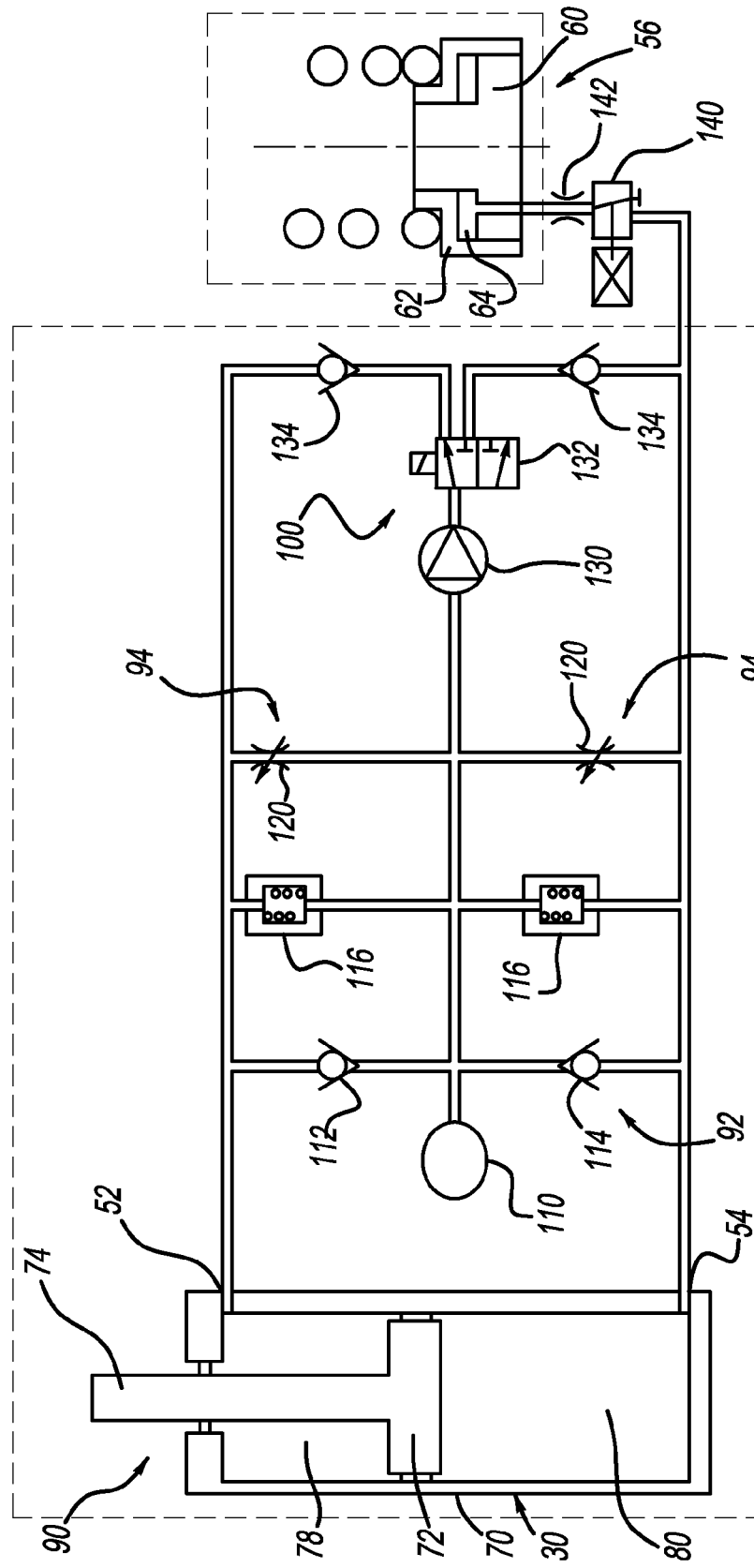
FIG. 3 is a schematic view of fluid connection between the hydraulic actuator for the active suspension system and the leveling system.

Referring to FIG. 3, a hydraulic actuator assembly 90 comprises shock absorber 30, a low pressure accumulator subsystem 92, one or more pressure divider subsystems 94, and a flow divider subsystem 100.

Low pressure accumulator subsystem 92 comprises a low pressure accumulator 110, a first check valve 112 and a second check valve 114. First check valve 112 allows fluid flow from low pressure accumulator 110 to upper working chamber 78 but prohibits fluid flow from upper working chamber 78 to low pressure accumulator 110. Second check valve 114 allows fluid flow from low pressure accumulator 110 to lower working chamber 80 but prohibits fluid flow from lower working chamber 80 to low pressure accumulator 110. Low pressure accumulator 110 is connected to a pair of blow-off valves 116, the one or more pressure divider subsystems 94 and flow divider subsystem 100.

The two pressure divider subsystems 94 illustrated in FIG. 3 include a rebound pressure divider subsystem 94 (the upper pressure divider subsystem) and a compression pressure divider subsystem 94 (the lower pressure divider subsystem). Each pressure divider subsystem 94 comprises a controlled restriction 120. In rebound pressure divider subsystem 94, controlled restriction 120 is located between upper working chamber 78 and flow divider subsystem 100 and between upper working chamber 78 and low pressure accumulator 110. In the compression pressure divider subsystem 94, controlled restriction 120 is located between lower working chamber 80 and flow divider subsystem 100 and between lower working chamber 80 and low pressure accumulator 110.

Pressure divider subsystem 94 creates a requested pressure in upper working chamber 78 and/or lower working chamber 80.

Flow divider subsystem 100 comprises a pump 130, a hydraulic switch valve 132 and a pair of check valves 134. Flow divider subsystem 100 controls the hydraulic energy from pump 130. Pump 130 receives fluid from low pressure accumulator 110. Fluid from pump 130 is directed to hydraulic switch valve 132. Hydraulic switch valve 132 can guide fluid flow to upper working chamber 78 and/or lower working chamber 80 depending on where it is needed. Hydraulic switch valve 132 can also divide the flow between upper working chamber 78 and lower working chamber 80 in a continuously controlled manner. While hydraulic switch valve 132 is illustrated using a symbol of a switch valve, this is not intended to limit the disclosure. Check valves 134 prohibit fluid flow from upper working chamber 78 and lower working chamber 80 to flow divided subsystem 100.

As illustrated in FIG. 3, fluid chamber 64 of hydraulic adjustable spring seat assembly 56 is in fluid communication with hydraulic actuator assembly 90. This connection allows for the changing of the static vehicle height and the compensation for static load changes by adjusting the height of body 16 with respect to front suspension 14 based upon the fluid pressures within hydraulic actuator assembly 90.

When an increased static (or quasi-static) push-out force must be created in shock absorber 30, hydraulic actuator assembly 90 will deliver this force by increasing the pressure in lower working chamber 80. This will be accomplished by having pump 130 provide high pressure fluid to lower working chamber 80 through hydraulic switch valve 132. When the fluid pressure in lower working chamber 80 rises above the static pressure in fluid chamber 64 of hydraulic adjustable spring seat assembly 56, a control valve 140 can be opened to allow fluid flow to enter fluid chamber 64 of hydraulic adjustable spring seat assembly 56. The fluid pressure in fluid chamber 64 will push outer housing assembly 62 upwards to raise vehicle body 16 and gradually take over the static load for vehicle body 16 from hydraulic actuator assembly 90. A restriction 142 limits the amount of fluid flow that leaves hydraulic actuator assembly 90 preserving pressure levels in hydraulic actuator assembly 90.

For the final adjustment, the fluid pressure in both upper working chamber 78 and lower working chamber 80 will be increased to maintain enough pressure to move hydraulic adjustable spring seat assembly 56 to its new position. When this final position of hydraulic adjustable spring seat assembly 56 is reached, control valve 140 will be closed.

When the static (or quasi-static) push-out force in lower working chamber 80 must be lowered, first the fluid pressure in upper working chamber 78 will be increased by providing pressurized fluid from pump 130 through hydraulic switch valve 132. This will provide a counter-acting force. The pressure in lower working chamber 80 will be low, near the pressure in low pressure accumulator 110. Control valve 140 can be opened and fluid will flow from fluid chamber 64 of hydraulic adjustable spring seat assembly 56 into the low pressure side of hydraulic actuator assembly 90. Restriction 142 will limit this flow to a level that is not distortive to the function of hydraulic actuator assembly 90. Gradually the counter-acting rebound force generated by hydraulic actuator assembly 90 will be reduced. Control valve 140 is preferably a low-flow bi-directional normally-closed hydraulic valve.

Figure 4:
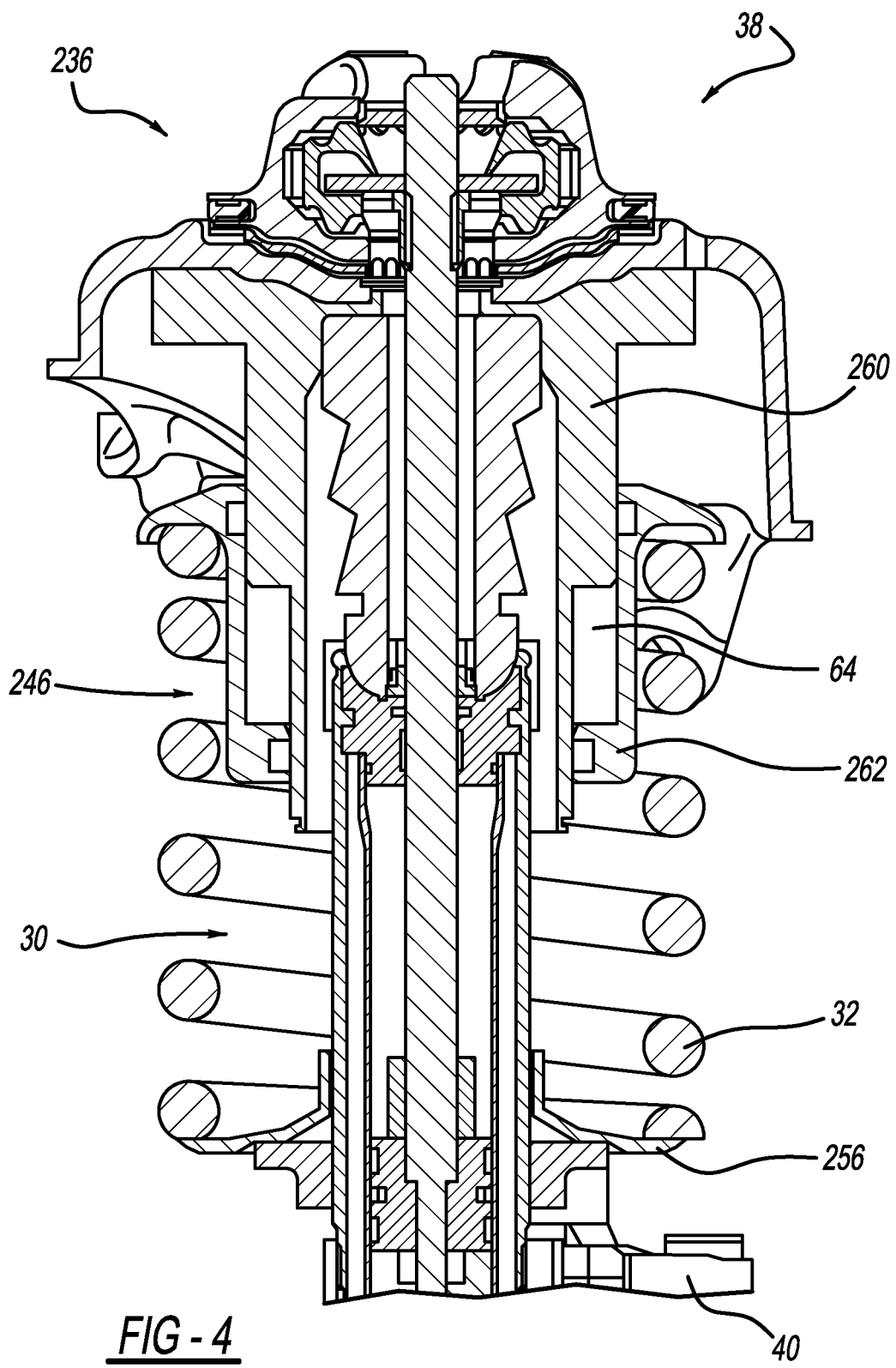
FIG. 4 is a schematic view of a corner assembly including a hydraulic actuator in accordance with another embodiment of the present disclosure.

The present disclosure is not limited to hydraulic adjustable lower spring seat assembly 56. FIG. 4 illustrates a strut assembly 236. Strut assembly 236 comprises shock absorber 30, coil spring 32, top mount assembly 38, a part of the sprung portion of the vehicle, and knuckle 40 which is a portion of the unsprung portion of the vehicle. The above discussion regarding strut assembly 36 in relation to top mount assembly 38 applies to strut assembly 236 also. The difference between strut assembly 236 and strut assembly 36 is that upper spring seat 46 has been replaced with upper spring seat assembly 246 and lower spring seat assembly 56 has been replaced with lower spring seat 256.

Upper spring seat assembly 246 is a hydraulically adjustable spring seat assembly which is attached to top mount assembly 38. Coil spring 32 is disposed between upper spring seat assembly 246 and lower spring seat 256. Hydraulic adjustable spring seat assembly 246 includes an inner housing assembly 260 attached to top mount assembly 38 and an outer housing assembly 262 that is attached to both inner housing assembly 260 and coil spring 32. Inner housing assembly 260 and outer housing assembly 262 define fluid chamber 64. When fluid is added to fluid chamber 64, outer housing assembly 262 will move downward along inner housing assembly 260, as illustrated in FIG. 4. This movement will raise vehicle body 16 with respect to front suspension 14. When fluid is removed from fluid chamber 64, outer housing assembly 262 will move upward along inner housing assembly 260, as illustrated in FIG. 4. This movement will lower vehicle body 16 with respect to front suspension 14. Fluid chamber 64 is in fluid communication with shock absorber 30 as described above.

The operation and function of hydraulically adjustable spring seat assembly 246 in conjunction with hydraulic actuator assembly 90 is the same as discussed above for adjustable spring seat assembly 56. FIG. 4 represents the adjusting of the upper spring seat rather than the lower spring seat illustrated in FIG. 2.

The advantages of the systems described above include a low cost addition of static load leveling and height adjustment capability to the active suspension system and the ability to lower energy consumption and increase roll control performance in long corners of hydraulic actuator assembly 90.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A corner assembly comprising:
   a top mount assembly;
   a wheel assembly;
   a shock absorber disposed between said top mount assembly and said wheel assembly, said shock absorber including a pressure tube defining a first fluid chamber and a piston slidably disposed within said pressure tube, said piston dividing said first fluid chamber into an upper working chamber and a lower working chamber;
   an upper spring mount attached to said top mount assembly;
   a lower spring mount attached to said wheel assembly;
   a spring disposed between said upper spring mount and said lower spring mount; wherein
   one of said upper spring mount and said lower spring mount is adjustable, said one of said upper spring mount and said lower spring mount includes: an inner housing assembly attached to one of said wheel assembly and said top mount assembly; an outer housing assembly attached to said spring; and a second fluid chamber disposed between said inner housing assembly and said outer housing assembly, said second fluid chamber being in fluid communication with said first fluid chamber defined by said pressure tube of said shock absorber.

2. The corner assembly according to claim 1, wherein said inner housing assembly is attached directly to said shock absorber.

3. The corner assembly according to claim 1, wherein said second fluid chamber is in fluid communication with said lower working chamber defined by said shock absorber.

4. The corner assembly according to claim 1, wherein said fluid chamber is a sealed fluid chamber.

5. The corner assembly according to claim 1, wherein said lower spring mount is adjustable:

said inner housing assembly is attached to said wheel assembly;

said outer housing assembly slidably engages said inner housing assembly.

6. The corner assembly according to claim 5, wherein said inner housing assembly is attached directly to said shock absorber.

7. The corner assembly according to claim 5, wherein said second fluid chamber is in fluid communication with said lower working chamber defined by said shock absorber.

8. The corner assembly according to claim 5, wherein said fluid chamber is a sealed fluid chamber.

9. The corner assembly according to claim 1, wherein said upper spring mount is adjustable:

said inner housing assembly is attached to said top mount assembly;

said outer housing assembly slidably engages said inner housing assembly.

10. The corner assembly according to claim 9, wherein said inner housing assembly is attached directly to said shock absorber.

11. The corner assembly according to claim 9, wherein said second fluid chamber is in fluid communication with said lower working chamber defined by said shock absorber.

12. The corner assembly according to claim 9, wherein said fluid chamber is a sealed fluid chamber.

13. The corner assembly according to claim 9, wherein said second fluid chamber is in fluid communication with said upper working chamber defined by said shock absorber.

14. The corner assembly according to claim 1, wherein said second fluid chamber is in fluid communication with said upper working chamber defined by said shock absorber.

\* \* \* \* \*